United States Patent
Yamada

(10) Patent No.: US 7,920,146 B2
(45) Date of Patent: Apr. 5, 2011

(54) USER INTERFACE PROVIDING DEVICE

(75) Inventor: Rui Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 1311 days.

(21) Appl. No.: 11/175,370

(22) Filed: Jul. 7, 2005

(65) Prior Publication Data

US 2006/0017855 A1 Jan. 26, 2006

(30) Foreign Application Priority Data

Jul. 21, 2004 (JP) ................ P2004-212509

(51) Int. Cl.
*G09G 1/28* (2006.01)
*G09G 5/02* (2006.01)
*G06K 9/00* (2006.01)

(52) U.S. Cl. ........... 345/594; 345/22; 345/428; 382/162

(58) Field of Classification Search .......... 345/22, 345/428, 589, 594, 606, 619; 382/167, 274, 382/650, 162

See application file for complete search history.

(56) References Cited

U.S. PATENT DOCUMENTS

| | | | | |
|---|---|---|---|---|
| 6,337,692 | B1 * | 1/2002 | Rai et al. ............... | 345/594 |
| 6,928,187 | B2 * | 8/2005 | Cooper et al. ........... | 382/167 |
| 7,215,813 | B2 * | 5/2007 | Graves et al. ........... | 382/167 |
| 2002/0163527 | A1 * | 11/2002 | Park ..................... | 345/594 |
| 2004/0234126 | A1 * | 11/2004 | Hampshire et al. ....... | 382/162 |

FOREIGN PATENT DOCUMENTS

| | | |
|---|---|---|
| JP | 05-207305 | 8/1993 |
| JP | 11-075076 | 3/1999 |
| JP | 2000-115555 | 4/2000 |
| JP | 2003-304409 | 10/2003 |

* cited by examiner

*Primary Examiner* — Amare Mengistu
*Assistant Examiner* — Aaron M Guertin
(74) *Attorney, Agent, or Firm* — Rader, Fishman & Grauer PLLC

(57) ABSTRACT

A user interface providing device provides a user interface that handles correction of a pixel value of each pixels forming image data. The user interface includes a hue setting unit for selecting a pixel by designating a hue.

15 Claims, 7 Drawing Sheets

11: OVEREXPOSED HIGHLIGHT PIXEL

12: FALSE-COLOR (PURPLE-FRINGE) PIXEL

13: OTHER PIXEL

USER INTERFACE PROVIDING DEVICE

CROSS REFERENCES TO RELATED APPLICATIONS

The present invention contains subject matter related to Japanese Patent Application JP 2004-212509 filed in the Japanese Patent Office on Jul. 21, 2004, the entire contents of which are incorporated herein by reference.

BACKGROUND OF THE INVENTION

1. Field of the Invention

The present invention relates to user interface providing devices, and more particularly, to a user interface providing device that is capable of handling image processing involving correction of pixel values of image data, such as images photographed with digital cameras, and that is particularly suitable for correction of a pixel value of a particular selected pixel, with an improved operability in setting various parameters used for processing, setting processing states, and the like.

2. Description of the Related Art

Nowadays, digital cameras are widely used. Many users routinely display images photographed with digital cameras on screens of personal computers and print the images. When images photographed with cameras are output, a color different from a natural color may be output.

In order to solve such a problem, image processing programs capable of adjusting hues, saturations, and the like of photographed images are provided. However, since many parameters are used for image adjustment, unfamiliar users find it difficult to perform image adjustment. Changing the hue and the saturation of the entire photographed image data is relatively easy. However, for example, correcting a particular pixel selected from image data or changing a pixel value of only a selected image area is very troublesome for users.

For example, a false color may be generated on an image pickup face and the pixel value of a pixel in a particular position may be set to an unnatural value since the refractive index of light with respect to a lens material of a camera varies depending on the wavelength. This phenomenon is called chromatic aberration. Although a false color caused by chromatic aberration mainly appears in an edge portion of an image, a false color of the same extent does not necessarily appear uniformly in the entire image. In such a case, it is difficult for general users to select a pixel having an outstanding false color and to correct the pixel value of the selected pixel.

For example, as a phenomenon in which an incorrect pixel value is set due to chromatic aberration, which causes a false color, a purplish false color appears near an overexposed highlight pixel whose luminance level is saturated. This purplish false color is known as a purple fringe. Apart from purple fringes, a pixel whose pixel value is not specified or a pixel whose pixel value is incorrectly set may exist among pixels forming image data due to various types of trouble caused by a condition for photographing an image and data processing performed when the image is photographed.

It is very difficult for general users to efficiently select a pixel having a false color, which appears partially, and correct the pixel.

SUMMARY OF THE INVENTION

It is desirable to provide a user interface providing device capable of efficiently selecting, for example, a false-color pixel, such as a purple-fringe pixel appearing near an overexposed highlight pixel, and efficiently and accurately correcting the pixel value of the selected pixel.

According to an embodiment of the present invention, a user interface providing device provides a user interface that handles correction of a pixel value of each of the pixels forming image data. The user interface includes a hue setting unit for selecting a pixel by designating a hue.

The user interface may further include a saturation setting unit for selecting the pixel by designating a saturation.

The user interface may further include a selected color display unit for displaying color selection area information corresponding to the hue or the saturation set by the hue setting unit or the saturation setting unit.

The user interface may further include a search image area setting unit for setting a search image area in which the pixel whose hue is designated is selected.

The user interface may further include an overexposed highlight threshold value setting unit for setting a threshold value corresponding to a pixel value for selecting an overexposed highlight pixel from among the pixels forming the image data.

The user interface may further include an image display unit for selectively presenting an image to be corrected and a corrected image.

The image display unit may distinguishably display a pixel having a pixel value corresponding to the hue set by the hue setting unit.

The image display unit may distinguishably display an overexposed highlight pixel from among the pixels forming the image data.

The image display unit may present processed image data the are corrected based on a parameter updated by a user operation using the user interface in accordance with parameter updating processing.

The user interface may further include an area setting unit for selecting an image area to be corrected.

The user interface may further include a storage operation unit for storing a parameter set by a user operation using the user interface.

The user interface may further include a reading operation unit for reading from a storage unit a parameter set by a user operation using the user interface.

Other purposes, features, and advantages of the present invention will become apparent from the following description with reference to the embodiments of the present invention and the attached drawings. The term "system" in this specification means a logical aggregation of a plurality of devices, and it is not limited to a structure in which devices are arranged in the same casing.

As described above, a user interface includes hue and saturation setting units for selecting a pixel whose hue and saturation are designated. Thus, the user interface is capable of selecting the pixel based on setting information. With this arrangement, for example, a false-color pixel, such as a purple-fringe pixel, appearing near an overexposed highlight pixel can be efficiently selected, and correction of the pixel value of the selected pixel can be efficiently and accurately performed. In addition, the user interface sets a display area in which an original image to be corrected or a processed image after pixel value correction is displayed, and displays the processed image immediately after a parameter is updated. Thus, the user is able to change the settings while seeing the image-processed result. This enables image processing, such as reduction in a purple fringe problem, efficiently and effectively.

In addition, as described above, an area to be corrected is selected, and correction based on a set parameter can be performed only on the selected area. Thus, unlike a case where a failure may occur in image data when correction using only a pair of parameters is performed on the entire image, correction can be performed on only a limited part of the image. In addition, image processing can be performed based on a parameter that is different depending on the position in the image. Thus, not only a failure is prevented, but corrected image data with high quality can also be achieved.

DESCRIPTION OF THE PREFERRED EMBODIMENTS

Figure 1B:
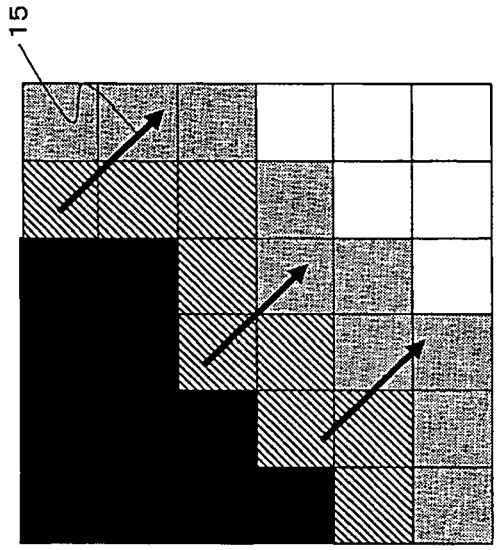
FIGS. 1A and 1B are illustrations for explaining hole-filling interpolation to reduce a purple fringe problem.

A user interface providing device according to embodiments of the present invention will be described with reference to the drawings.

An example of image processing performed using a user interface provided by a user interface providing device according to an embodiment of the present invention will be described with reference to FIG. 1.

As described in the description of the related art, a pixel whose pixel value is not specified or a pixel whose pixel value is incorrectly set may exist among pixels forming image data due to a purple fringe caused by chromatic aberration or due to various types of trouble caused by a condition for photographing an image and data processing performed when the image is photographed. A pixel value appropriate for such a pixel (target pixel) is determined in accordance with pixel values of surrounding pixels. This processing is called "hole filling" or "hole-filling interpolation".

An example of image data correction based on hole-filling interpolation to reduce a purple fringe problem caused by chromatic aberration will be described. FIG. 1A shows an example of image data in which a purple fringe appears due to chromatic aberration.

As shown in FIG. 1A, pixels are categorized into "overexposed highlight pixels 11", "false-color (purple-fringe) pixels 12", and "other pixels 13" (the "other pixels 13" are other than the overexposed highlight pixels 11 and the false-color (purple-fringe) pixels 12). Pixel values of the overexposed highlight pixels 11 and the false-color (purple-fringe) pixels 12 need to be reset, and these pixel values are determined in accordance with the other pixels 13. In other words, the pixel value of a pixel, such as the overexposed highlight pixel 11 or the false-color (purple-fringe) pixel 12, that needs to be corrected is set by acquiring an average of correctly-set pixel values of pixels surrounding the pixel whose pixel value needs to be corrected.

Figure 1A:
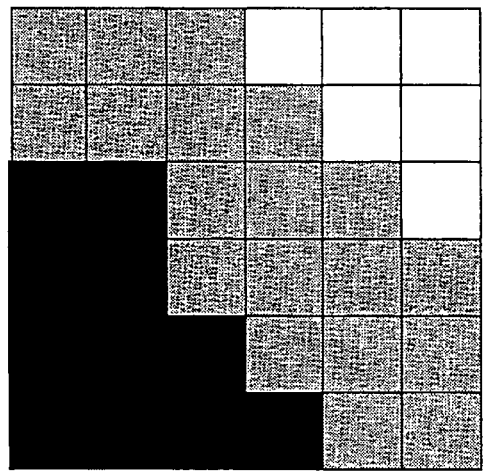

Such hole-filling interpolation is repeatedly performed in the direction of arrows 15 shown in FIG. 1B, and pixel values of pixels are sequentially set as "interpolated pixels 14". In other words, in the first hole-filling interpolation operation, a correction pixel value of a false-color (purple-fringe) pixel 12 adjacent to other pixels 13 is determined, and the false-color (purple-fringe) pixel 12 is set as the interpolated pixel 14.

Then, in the second hole-filling interpolation operation, a correction pixel value of a false-color (purple-fringe) pixel 12 adjacent to other pixels 13 or the interpolated pixel 14 generated by the first hole-filling interpolation operation is determined in accordance with the pixel values of the other pixels 13 or the interpolated pixel 14 generated by the first hole-filling interpolation operation, and the false-color (purple-fringe) pixel 12 is set as the interpolated pixel 14. These operations are repeatedly performed a number of times determined in advance or a number of times set by a user.

A process for correcting image data based on hole-filing interpolation will be described. Image data correction based on hole-filling interpolation to reduce the purple fringe problem is performed, for example, in accordance with the flowchart shown in FIG. 2.

In step S101, color space conversion processing is performed. In the color space conversion processing, an input image is subjected to color space conversion and separated into a luminance-component image and a color-component image. More specifically, for example, an input RGB image is converted and separated into a luminance-component image L and a color-component image C. In other words, an input RGB-color image is converted into color-space data having luminance components and color components separately. A color space of the converted data is, for example, YCbCr, CIE L*a*b*, or the like.

Then, in step S102, overexposed highlight area detection processing is performed. In the overexposed highlight area detection processing, an overexposed highlight area is detected among the input image data to be corrected. In accordance with a fact that a pixel having a purplish color with a significant chromatic aberration appears near an overexposed highlight area of the image, an overexposed highlight pixel is detected in step S102. An overexposed highlight pixel is detected by selecting a pixel whose pixel value exceeds a predetermined value (a pixel having a high luminance).

In step S103, false-color pixel search area setting (dilation) processing is performed. In the false-color pixel search area setting (dilation) processing, an area near the overexposed highlight pixel of the image that may include a false color, that is, a purple fringe, is set as a false-color pixel search area.

In step S104, false-color pixel detection processing is performed. In the false-color pixel detection processing, a purplish pixel within the search area is detected. In other words, a purplish pixel is selected as a false-color (purple-fringe) pixel, that is, a pixel to be interpolated.

In step S105, false-color pixel correction processing is performed. In the false-color pixel correction processing, color components of the detected purplish pixel are corrected. More specifically, a pixel is interpolated in accordance with pixel values of surrounding pixels. This processing is called hole-filling interpolation. As described with reference to FIGS. 1A and 1B, this processing is repeatedly performed in the direction of the arrows 15 shown in FIG. 1B. The number of repetition times can be set, for example, by the user. At this time, the saturation of a pixel whose pixel value is not corrected in spite of being needed to be corrected is reduced exceptionally.

In step S106, color gradation (filtering) processing is performed. In the color gradation (filtering) processing, filtering is performed so that a natural result can be achieved. In order to obscure the difference between the pixel value of a pixel subjected to correction in step S105 (a pixel interpolated based on surrounding pixels) and the pixel value of a pixel subjected to exceptional processing (a pixel whose saturation is reduced), color gradation is generally performed. Color gradation is performed by resetting pixel values so that a plurality of adjacent pixels exhibits a smooth change in pixel values.

In step S107, color-space inverse conversion processing is performed. In the color-space inverse conversion processing, contrary to the conversion performed in step S101, the color space data, which has luminance components and color components separately, is returned to the format of the input image.

When the user performs such image processing, various processing conditions and parameters need to be set.

For example, a threshold value is set by the overexposed highlight area detection processing in step S102. In other words, a threshold pixel value (luminance level) is set, and a pixel whose pixel value exceeds the threshold pixel value is selected as an overexposed highlight pixel. A condition for setting an area is set by the false-color pixel search area setting processing in step S103. In other words, an area, that is, the direction from and the number of pixels around an overexposed highlight pixel, regarded as a false-color (purple-fringe) pixel search area, is set. A pixel value (color) of a pixel to be selected as a false color (purple fringe) is set by the false-color pixel detection processing in step S104. The number of repetition times of hole filling operations is set by the false-color pixel correction processing in step S105. The number of repetition times of color gradation operations is set by the color gradation (filtering) processing in step S106. However, since color gradation is performed in order to eliminate unnaturalness of purple fringes after correction, the number of repetition times of color gradation operations can be automatically adjusted so as to correspond to the resolution of a final image. Thus, the user does not necessarily set the number of repetition times of color gradation operations.

Flexible image processing can be achieved by changing values of conditions and parameters by users. Such processing conditions and parameters will be described.

An overexposed highlight threshold value, which is a first parameter, is a threshold luminance to determine whether or not a pixel is an overexposed highlight pixel. If the luminance of a pixel of an original image to be corrected exceeds a predetermined threshold value, the pixel is determined to be an overexposed highlight pixel. If the user sets this threshold value, image processing for reducing a purple fringe problem can be performed more flexibly.

Although a purple fringe appears near an overexposed highlight, a possible range of a purple fringe appearing near the overexposed highlight varies depending on the position (x,y) in an image. The range (x0,y0,x1,y1) is used for the image processing for reducing the purple fringe problem. In addition, the size of an appearing purple fringe changes depending on the type of an optical system and the settings of a diaphragm and a focal length of the optical system. If the user sets these ranges, processing for reducing the purple fringe problem can be performed more flexibly. In addition, the number of repetition times of hole filling operations can be set in accordance with the appearing range.

Then, it is determined whether or not a purple fringe appears in a pixel near the overexposed highlight by checking color information. For example, it is determined whether or not a scalar value representing a hue is within a designated range, and it is determined whether or not a scalar value representing a saturation is within another designated range. Thus, it is determined whether or not the pixel near the overexposed highlight has a false color. If the user designates the hue range and the saturation range as parameters, image processing can be performed more effectively.

In the user interface provided by the user interface providing device according to the embodiment of the present invention, the user is able to freely set these parameters. In addition, the user interface includes areas for presenting hue and saturation information corresponding to set parameters when the user sets the parameters. Moreover, the user interface presents a corrected image based on the set parameters. The arrangement of the user interface provided by the user interface providing device according to the embodiment of the present invention is described next with reference to FIG. 3.

Figure 3:
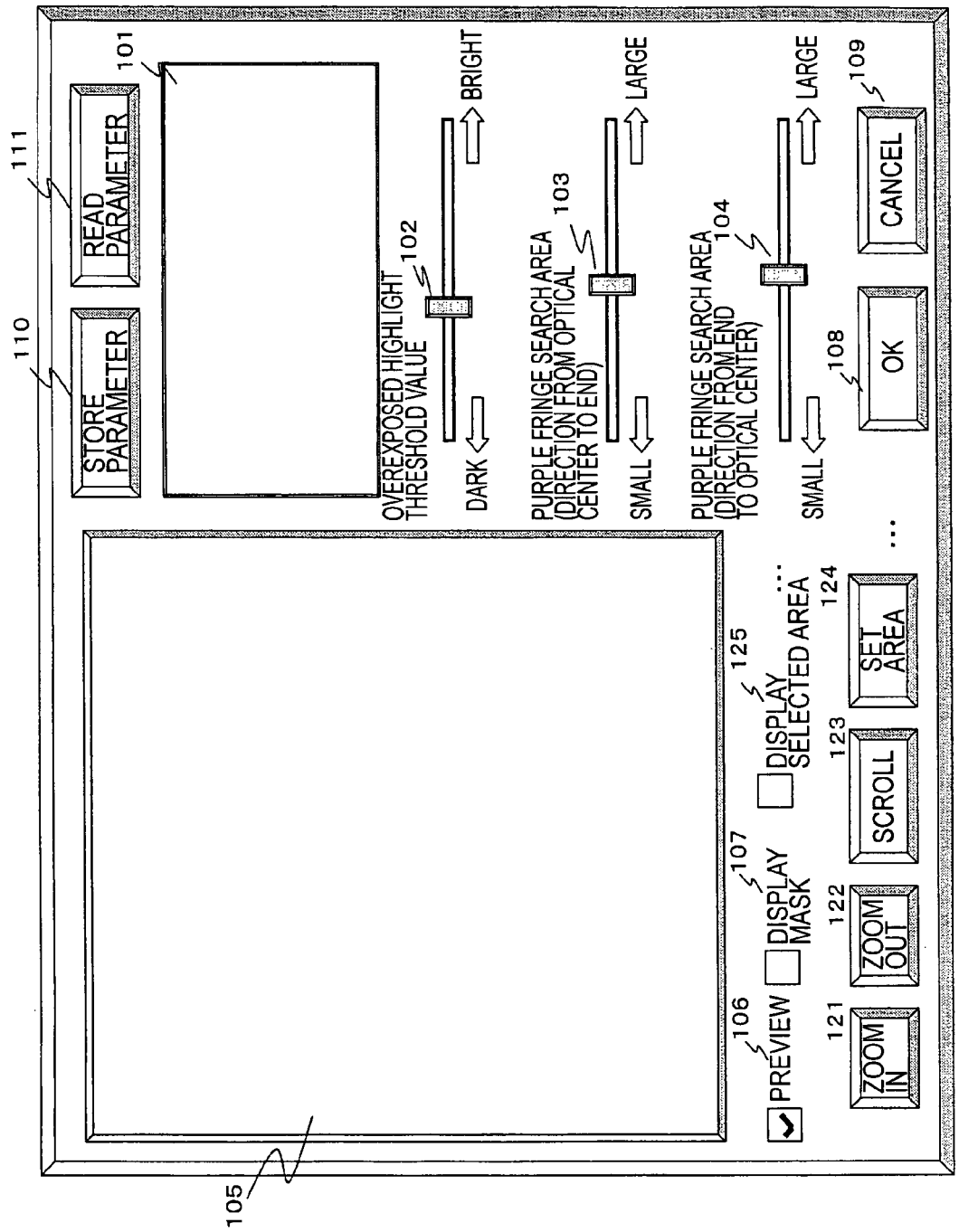
FIG. 3 shows the arrangement of a user interface provided by a user interface providing device according to an embodiment of the present invention.

The user interface shown in FIG. 3 is suitable for selecting a particular pixel in image data and correcting the selected pixel and is capable of efficiently and accurately performing the image processing described above for reducing the purple fringe problem. Although an example of correction in which an image including a purple fringe is regarded as an image to be corrected and in which the correction is performed in order to reduce the purple fringe problem will be described below, the user interface providing device according to the embodiment of the present invention is also capable of handling other types of image processing for correcting pixel values as well as image processing for reducing the purple fringe problem.

The user interface shown in FIG. 3 is displayed on, for example, a display screen attached to an image processing device. The user is able to set various processing conditions, parameters, and the like by using an input unit including a keyboard and a mouse connected to the image processing device. The user designates an image to be corrected, and the user interface shown in FIG. 3 is displayed.

The arrangement of the user interface will be described with reference to FIG. 3.

A purple fringe hue and saturation setting display section 101 displays settings of the hue and saturation of a purple fringe and a selected color.

An overexposed highlight threshold value setting field 102 sets a threshold pixel value of a pixel to be selected as an overexposed highlight pixel.

Purple fringe search area setting fields 103 and 104 are user setting units for determining conditions for setting a false-color pixel search area to be set near the overexposed highlight pixel. In other words, the user can set an area, that is, the size and the direction from the overexposed highlight, regarded as a false-color (purple-fringe) pixel search area.

The purple fringe search area setting field 103 includes a slider for setting the size of a search area for a purple fringe appearing in the outward direction of the overexposed highlight when viewed from the optical center, and the purple fringe search area setting field 104 includes a slider for setting the size of a search area of a purple fringe appearing in the inward direction of the overexposed highlight when based on the optical center. The user is able to change the settings by moving the sliders using the input unit, such as the mouse or the keyboard.

An image display section 105 displays an original image to be corrected, a result image after correction, or a mask image indicating an overexposed highlight pixel and a purple-fringe pixel.

Display image setting fields 106 and 107 are used for setting an image to be displayed in the image display section 105.

An OK button 108 is used for setting image processing for the original image based on the parameters set by the user, and a cancel button 109 is used for setting no operation for the original image.

A parameter storage button 110 is used for storing various parameters set by the user interface, and a parameter read button 111 is used for reading the stored parameters.

A zoom-in display button 121 and a zoom-out display button 122 are used for zooming in and zooming out an image displayed in the image display section 105. A scroll button 123 and an area setting button 124 are used for scrolling the image and setting a display area in the image display section 105. A selected area display setting field 125 is a setting field for providing a tick when the user sets a display area.

Component parts of the user interface will be described with reference to FIGS. 4 to 6. An example of the arrangement of the purple fringe hue and saturation setting display section 101 is described next with reference to FIG. 4.

Figure 4:
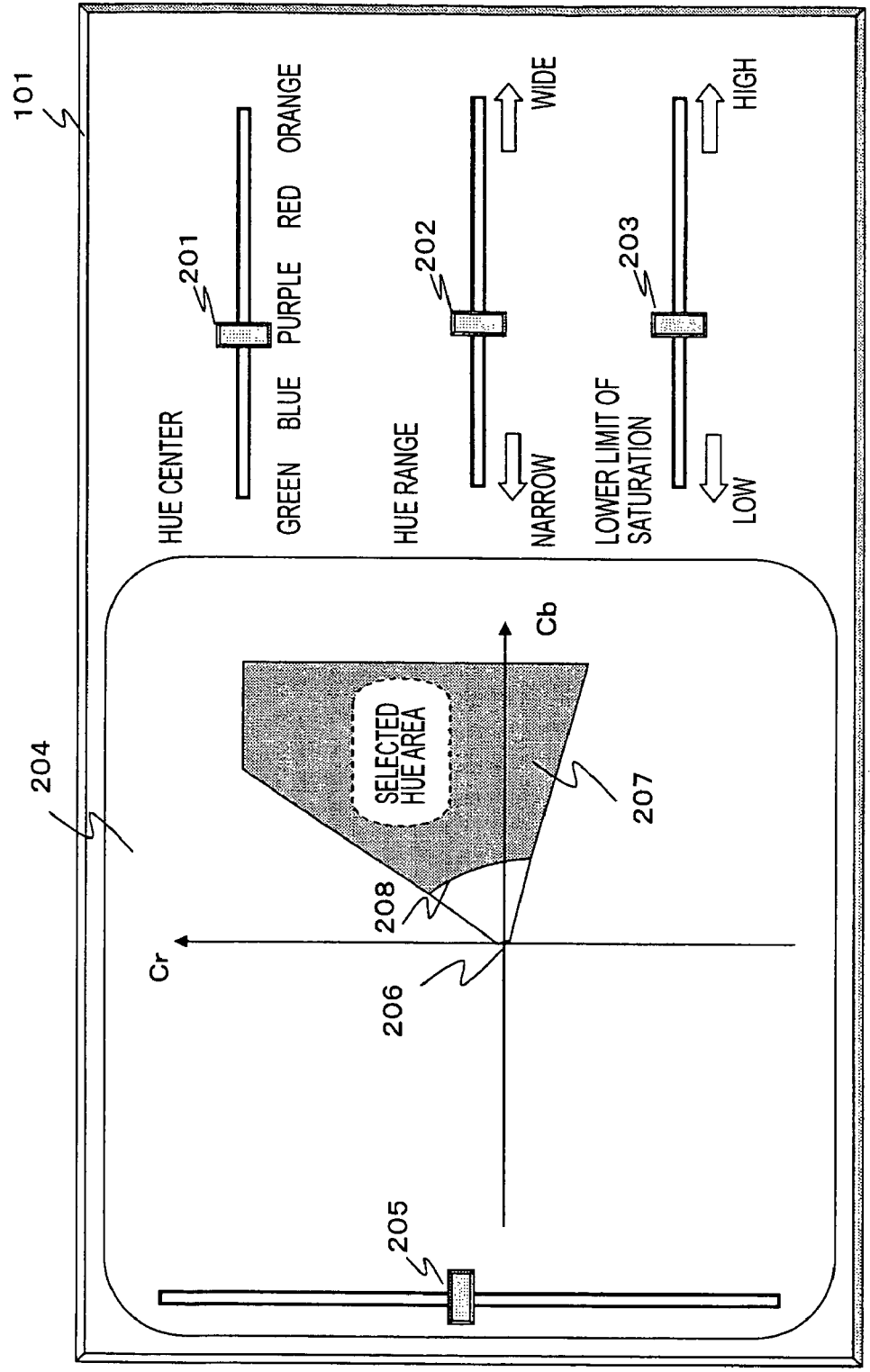
FIG. 4 shows the arrangement of a purple fringe hue and saturation setting display unit in the user interface provided by the user interface providing device according to the embodiment of the present invention.

FIG. 4 shows an example of the purple fringe hue and saturation setting display section 101. In this embodiment, an example in which a color space YCbCr is used for correcting an image is described. In the YCbCr space, each pixel is represented by Y, which represents luminance, and CbCr, which represents color. The hue and the saturation of a purple fringe are determined by using the value of CbCr. Here, a hue h is represented by the following condition:

$$h = \arctan(Cr\text{-}128, Cb\text{-}128) \quad (1).$$

In addition, a saturation s is represented by the following condition:

$$s = \sqrt{(Cr\text{-}128)^2 + (Cb\text{-}128)^2} \quad (2)$$

As shown in FIG. 4, the purple fringe hue and saturation setting display section 101 includes a hue center setting field 201, a hue range setting field 202, and a saturation lower-limit setting field 203. The hue center setting field 201 is used for designating a hue assumed as a purple fringe. The hue range setting field 202 is used for designating the size of the range of the hue centered on the value designated by the hue center setting field 201. The saturation lower-limit setting field 203 is used for setting the lower limit of the saturation (a saturation lower limit 208 shown in a selected color display field 204). The details of these fields will be described below with reference to FIG. 5.

The selected color display field 204 displays the selected color of the purple fringe. In other words, hue selection area information, which functions as color selection information for selecting a color of a pixel to be corrected, is displayed. Since it is difficult to display all the selected colors in a single two-dimensional image, the selected color display field 204 includes a luminance setting slider 205 for changing the value of a luminance Y.

If the luminance setting slider 205 is set to a point, color information of a hue space (Cb,Cr) at a luminance Y corresponding to the set point is two-dimensionally displayed. Accordingly, the user is able to display all the selected colors in the selected color display field 204. In the selected color display field 204, a Cb axis and a Cr axis are provided in the lateral direction and in the longitudinal direction, respectively, centered on an origin 206, which is represented by Cb=128 and Cr=128, and selected colors are displayed. Based on a point represented as the origin 206, a selected hue area 207 within selected hue and saturation ranges at the luminance Y that is currently selected via the luminance setting slider 205 is plotted and displayed.

A specific example of color selection by the hue center setting field 201, the hue range setting field 202, and the saturation lower-limit setting field 203 of the purple fringe hue and saturation setting display section 101 will be described with reference to FIG. 5.

Figure 5:
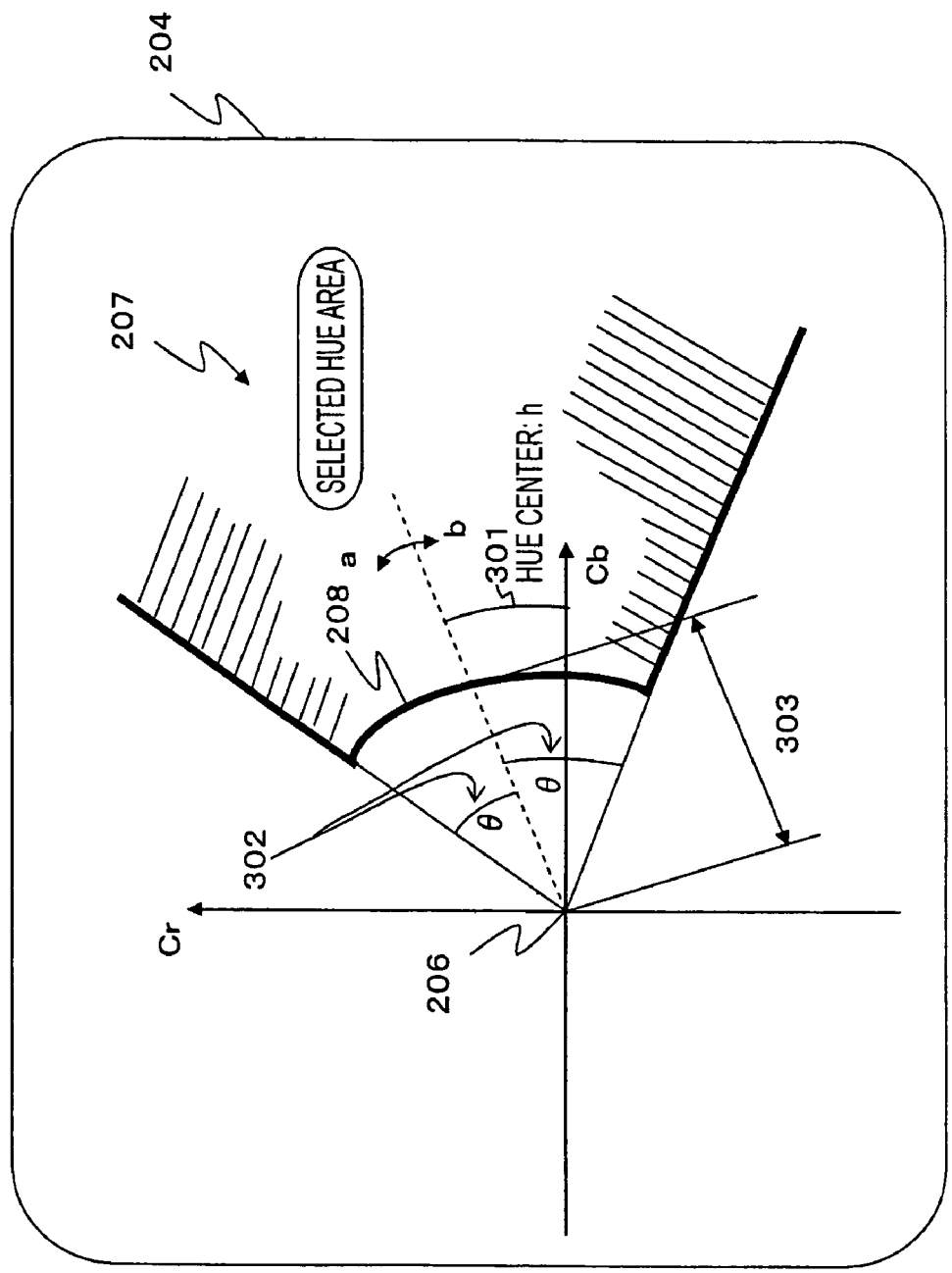
FIG. 5 is an illustration for explaining processing performed by the purple fringe hue and saturation setting display unit in the user interface provided by the user interface providing device according to the embodiment of the present invention.

FIG. 5 shows the selected color display field 204 in the purple fringe hue and saturation setting display section 101. Centered on the origin 206, color is plotted based on the Cb axis and the Cr axis. An angle 301 corresponds to a hue center h, which is a value representing a hue. The angle 301 is calculated by condition (1). The hue center setting field 201 designates the hue center h. The hue center h moves in the directions represented by the arrows a and b in FIG. 5 by moving the slider of the hue center setting field 201 in FIG. 4 left and right.

A hue range setting angle (θ) 302 is set by the hue range setting field 202 and defines a hue range to be selected as a purple fringe hue based on the hue center h. For example, if the hue of the hue center h represents a purple color specified by Cb and Cr values, a range of color having Cb and Cr values that are different from but similar to the Cb and Cr values of the hue of the hue center h can be set by the hue range setting field 202. By moving the slider of the hue range setting field 202 in FIG. 4 from narrow to wide, the hue range setting angle (θ) 302 changes from 0 to MAX (for example, 180 degrees).

FIG. 5 shows a state in which the hue range from h−θ to h+θ is selected as a purple fringe hue centered on the hue center h selected as a color having particular Cb and Cr values.

In FIG. 5, the saturation lower limit 208 is set as a lower limit of a saturation range. The saturation lower limit 208 is calculated based on condition (2). An area in which saturation exceeds the saturation lower limit 208 is regarded as the selected hue area 207, which is selected as a purple fringe hue. By moving the slider of the saturation lower-limit setting field 203 in FIG. 4 from low to high, a saturation lower-limit setting distance 303 in FIG. 5 changes from small to large, and the saturation lower limit 208 of the selected hue area 207 thus changes.

As described above, the user is able to efficiently and accurately select a hue range of a pixel to be selected as a purple-fringe pixel by operating the sliders of the hue center setting field 201, the hue range setting field 202, and the saturation lower-limit setting field 203. Since the selected color range is displayed in the selected color display field 204, the user can easily see which color is selected. Since the selected hue area 207 displayed in the selected color display field 204 is updated immediately after the user operates the slider of the hue center setting field 201, the hue range setting field 202, or the saturation lower-limit setting field 203, the user is able to select a color to be selected as a purple fringe while seeing a selected hue.

Although the purple fringe hue and saturation setting display section 101 includes the hue center setting field 201, the hue range setting field 202, and the saturation lower-limit setting field 203 and the user sets hue and saturation to be selected as a purple fringe by adjusting the hue center setting field 201, the hue range setting field 202, and the saturation lower-limit setting field 203 in the foregoing description, a color range of a purple fringe may be set as described below. For example, the color of a pixel of an original image to be corrected, which is displayed in the image display section 105 shown in FIG. 3, may be directly selected. The user may select a pixel determined as a purple fringe using a mouse or the like, and may set hue and saturation ranges of a purple fringe by widening the hue and saturation ranges so as to include the color of the pixel. In contrast, if the user explicitly selects a pixel not including a purple fringe, the hue and saturation ranges may be narrowed so as not to include the color of the pixel. Accordingly, the user is able to set the hue and saturation ranges, that is, the color range, of a pixel to be selected as a purple fringe while using a real image to be corrected.

Setting of an overexposed highlight threshold value based on an operation of the overexposed highlight threshold value setting field 102 shown in FIG. 3 is described next. By moving the slider of the overexposed highlight threshold value setting field 102 in FIG. 3, the user is able to change a threshold value of a pixel to be selected as an overexposed highlight pixel. The overexposed highlight threshold value setting field 102 sets a threshold luminance of a pixel to be selected as an overexposed highlight pixel. In this embodiment, a color space YCbCr is used, and it is determined whether or not a pixel is an overexposed highlight pixel by determining whether or not the luminance Y exceeds the threshold value set by the overexposed highlight threshold value setting field 102. In other words, a pixel having a luminance higher than the threshold value set by the overexposed highlight threshold value setting field 102 is selected as an overexposed highlight pixel.

Processing based on operations of the purple fringe search area setting fields 103 and 104 in FIG. 3 is described next. The purple fringe search area setting fields 103 and 104 are user setting units for determining conditions for setting a false-color pixel search area to be set near an overexposed highlight pixel. In other words, the purple fringe search area setting fields 103 and 104 are used as search image area setting units for setting a search image area as a search area for a pixel having hue and saturation set by the purple fringe hue and saturation setting display section 101.

More specifically, the purple fringe search area setting fields 103 and 104 are used as operation units for setting an area, that is, the size and the direction from an overexposed highlight pixel, regarded as a false-color (purple-fringe) pixel search area. The purple fringe search area setting field 103 includes the slider for setting the size of a range of a purple fringe appearing in the outward direction of the overexposed highlight when viewed from the optical center, and the purple fringe search area setting field 104 includes the slider for setting the size of a range of a purple fringe appearing in the inward direction of the overexposed highlight when based on the optical center. The user is able to change the settings by moving the sliders using the input unit, such as the mouse or the keyboard.

Here, it is assumed that an overexposed highlight pixel is located at a two-dimensional position (x,y) in an image to be corrected. The overexposed highlight pixel has a luminance higher than the threshold luminance set by the overexposed highlight threshold value setting field 102. The purple fringe search area setting fields 103 and 104 set an area near the overexposed highlight pixel for searching for a pixel in which a purple fringe appears.

The size of a purple fringe appearing near an overexposed highlight changes depending on the type of an optical system, settings of a diaphragm and the focal length of the optical system, and the position (x,y) of the overexposed highlight. In many cases, a purple fringe appears in the direction from an overexposed highlight to the optical center (inward direction: from an end to the optical center) or in the 180-degree opposite direction (outward direction: from the optical center to the end).

A specific example of purple-fringe pixel search area setting processing based on operations of the purple fringe search area setting fields 103 and 104 is described next with reference to FIG. 6.

Figure 6:
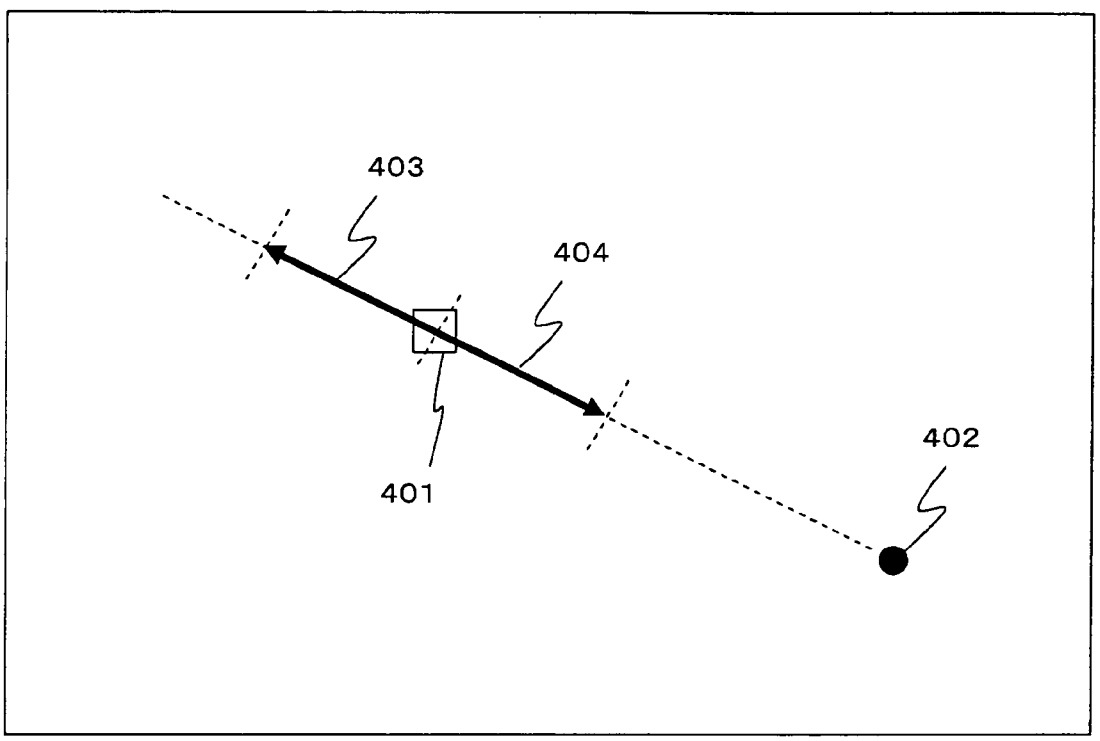
FIG. 6 is an illustration for explaining setting processing performed by purple fringe search area setting units in the user interface provided by the user interface providing device according to the embodiment of the present invention.

In FIG. 6, an overexposed highlight appears in an overexposed highlight pixel 401. An optical center 402 is a position corresponding to the optical center of an image. A direction represented by an arrow 403 is an outward direction of the overexposed highlight pixel 401. A direction represented by an arrow 404 is an inward direction of the overexposed highlight pixel 401.

The purple fringe search area setting field 103 shown in FIG. 3 sets a purple-fringe pixel search area in the direction represented by the arrow 403 starting from the overexposed highlight pixel 401. The area set in the direction represented by the arrow 403 in FIG. 6 changes from small to large by moving the slider of the purple fringe search area setting field 103 in FIG. 3 from small to large.

The purple fringe search area setting field 104 shown in FIG. 3 sets a purple-fringe pixel search area in the direction represented by the arrow 404 starting from the overexposed highlight pixel 401. The area set in the direction represented by the arrow 404 in FIG. 6 changes from small to large by moving the slider of the purple fringe search area setting field 104 in FIG. 3 from small to large.

The size of a set area may be set in terms of the number of pixels. Alternatively, the size of the set area may be set in terms of the proportion to the angle of view. For example, a size of 1% or 1.5% of the width of an image to be corrected may be set. The proportion to the width of the image is set by operating the purple fringe search area setting fields 103 and 104. Accordingly, an area can be set for image data of various sizes efficiently.

The image display section 105 in FIG. 3 shows an original image to be corrected, a processed image, a mask image indicating an overexposed highlight portion and a purple fringe portion, or the like. A displayed image can be zoomed in or zoomed out and a display position can be changed using a keyboard or a mouse. In addition, operating display image adjustment buttons, such as the zoom-in display button 121, the zoom-out display button 122, and the scroll button 123 for scrolling an image in FIG. 3, changes the state of an image displayed in the image display section 105.

The display image setting field 106 functions as a display image state setting and display unit for selecting between displaying an original image and displaying a processed image in the image display section 105. The display image setting field 106 includes a selected state indication portion and a label composed of character strings. When the user changes a selected state of the display image setting field 106 using the mouse or the keyboard, display of the selected state indication portion of the display image setting field 106 is updated. When the display image setting field 106 is not ticked, an original image is displayed in the image display section 105. When the display image setting field 106 is ticked, a processed image is displayed.

The display image setting field 107 in FIG. 3 functions as a mask image display state setting and display unit for selecting whether to display a mask image indicating an overexposed highlight portion and a purple fringe portion in the image display section 105. The display image setting field 107 also includes a selected state indication portion and a label composed of character strings. In the image processing according to this embodiment, pixels forming an image are categorized into overexposed highlights, purple fringes, and other pixels that are other than the overexposed highlights and the purple fringes. A mask image is, for example, an image in which overexposed highlight portions are represented in white, purple fringe portions are represented in purple, and other portions are represented in black and in which the resolution is equal to that of an original image.

If the display image setting field 107 is ticked, a semi-transparent mask image is superimposed on an original image or a processed image selected by the display image setting field 106 and displayed in the image display section 105. In other words, a pixel having a pixel value corresponding to a hue determined by hue setting and the like described with reference to FIG. 4, such as a purple-fringe pixel as a pixel to be corrected, is distinguishably displayed. In addition, an overexposed highlight pixel is distinguishably displayed among pixels forming image data. In contrast, if the display image setting field 107 is not ticked, only an image selected by the display image setting field 106 is displayed in the image display section 105.

Figure 2:
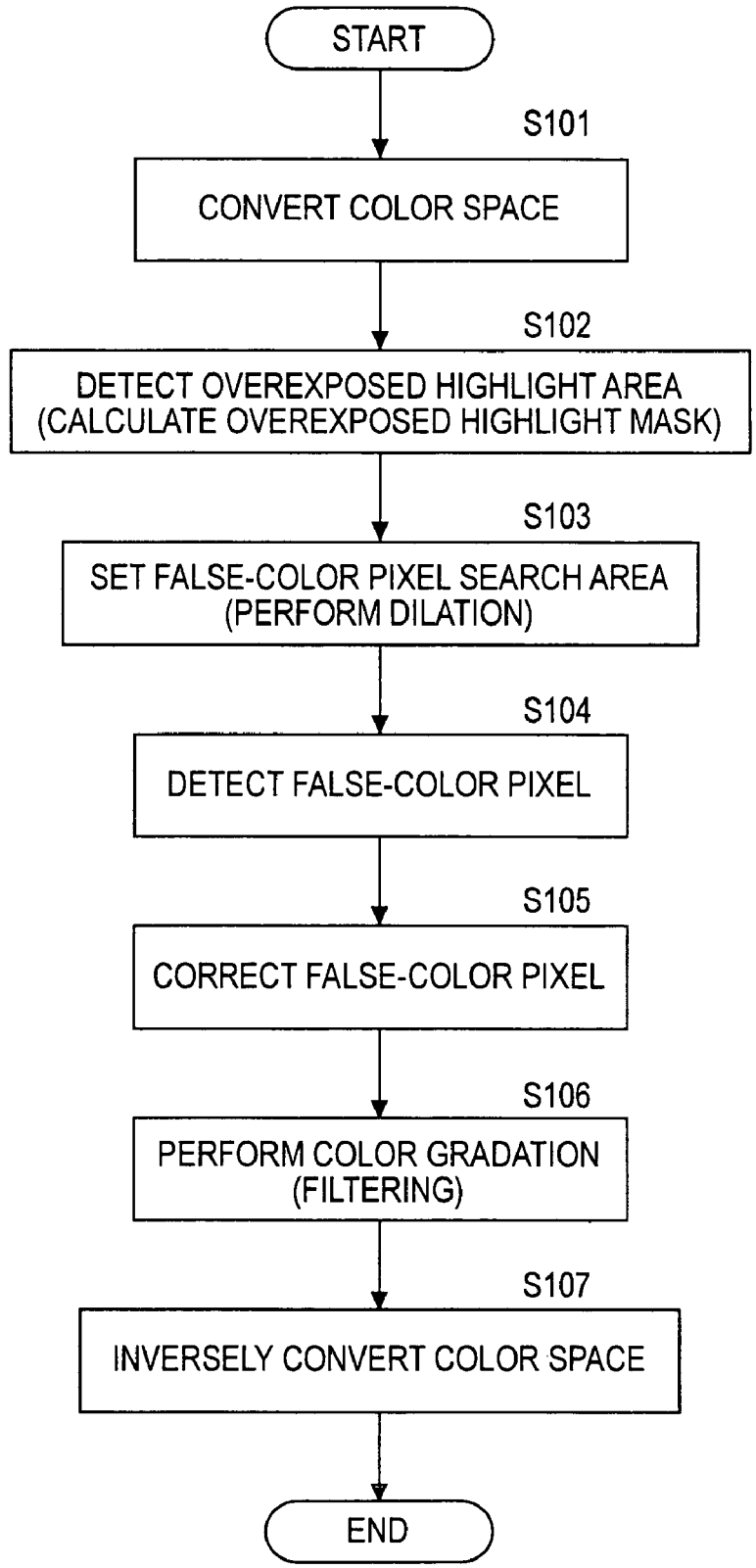
FIG. 2 is a flowchart showing an image correction process based on the hole-filling interpolation to reduce the purple fringe problem.

In the interface shown in FIG. 3, changes in various processing conditions and parameter settings by user operations using the operation units immediately affect the display of the image display section 105 or the display data of the selected color display field 204 described with reference to FIG. 4. In other words, a series of pixel value correction processings including hole-filling interpolation and color gradation described with reference to FIG. 2 are performed in accordance with the set parameters. Then, the processed image is displayed in the image display section 105.

The image display section 105 displays processed image data corrected based on parameters updated by user operations using the user interface in accordance with parameter updating processing. Hue selection area information corresponding to set parameters are updated and displayed immediately after the user updates the settings.

As described above, by operating setting units of the purple fringe hue and saturation setting display section 101, the overexposed highlight threshold value setting field 102, and the purple fringe search area setting fields 103 and 104, the user is able to set desired parameters for image processing. When a parameter is changed, an image processing device immediately performs recalculation and pixel value correction processing according to need, and the result is output as a display image in the image display section 105.

The user interface with this arrangement is also capable of handling image processing for only a part of an image to be corrected. After clicking the area setting button 124 in FIG. 3, for example, only a rectangular area, which is part of an image displayed in the image display section 105, designated using the input unit, such as a mouse, can be selected as an image to be processed. Then, correction processing for only the limited area can be performed based on set parameters. In other words, partial processing for reducing a purple fringe problem can be performed.

A set area is not necessarily a single rectangle. Any shape is possible as long as it is within an original image. For example, image processing may be performed on only a part having a desired shape designated using a stylus or the like. Only an area selected by the user can be selectively displayed in the image display section 105 by operating the selected area display setting field 125. When the user changes a selected area, an image processing device immediately performs recalculation, and the result affects a display image in the image display section 105.

When the OK button 108 in FIG. 3 is clicked using the input unit, an image-processed result is determined and a processed image is output as a result image. For example, a result image is output as a display output, a printer output, or storage data for a data file storage unit including a hard disk or the like. When the cancel button 109 is clicked, correction processing is canceled, and an original image is output as a result image.

When the entire image is processed using only a pair of parameters set by the user, a failure may occur in part of the image. In this case, part of an original image is selected and a parameter is adjusted. Image processing is performed on only the selected part in accordance with the selected parameter, and a result image is output. Then, another part of the result image is selected and another parameter is set. Accordingly, corrected image data in which a parameter used is different depending on an area of the image can be generated. With this correction processing, image processing can be performed using a parameter that is different depending on the position in an image. This not only avoids a failure but also achieves a more effective result image.

Moreover, in the user interface according to this embodiment, parameters set by user operations for the purple fringe hue and saturation setting display section 101, the overexposed highlight threshold value setting field 102, and the purple fringe search area setting fields 103 and 104 can be stored, and the stored parameters can be read.

When the user operates the parameter storage button 110 in FIG. 3 using the input unit, parameters set via the purple fringe hue and saturation setting display section 101, the overexposed highlight threshold value setting field 102, and the purple fringe search area setting fields 103 and 104 are immediately stored. For example, in accordance with the operation of the parameter storage button 110, a file name setting screen for inputting the name of a file appears on the display. When the user inputs the name of the file, the parameter is stored by the name of the file.

In addition, when the parameter read button 111 in FIG. 3 is operated, a parameter stored in a hard disk or the like is read, and the read parameter affects the user interface as a current setting. For example, when the parameter read button 111 is clicked, a file selection screen for selecting a file storing an existing parameter immediately appears on the display. A parameter is read from a file selected by the user, and the read parameter affects the current setting. Although not described here, for example, by using a stored parameter, a plurality of images can be designated by a single operation and image processing can be performed using the same parameter.

Although an example in which a purple fringe is selected as an object whose pixel value is to be corrected has been described in the foregoing embodiment, pixel data having particular hue and saturation can be selected from a particular area as an object to be corrected by the hue and saturation selection processing and the area setting processing described above in a case where a pixel having a particular hue, such as green, red, or orange, is selected and corrected. Correction processing, such as hole-filling interpolation and color gradation, can be performed on such a pixel.

As described above, for example, in a case where a pixel whose pixel value is not specified or a pixel whose pixel value is incorrectly set exists among pixels forming image data due to a purple fringe caused by chromatic aberration or due to various types of trouble caused by a condition for photographing an image and data processing performed when the image is photographed, the use of the user interface provided by the user interface providing device according to the foregoing embodiment enables efficient selection of such a pixel.

Figure 7:
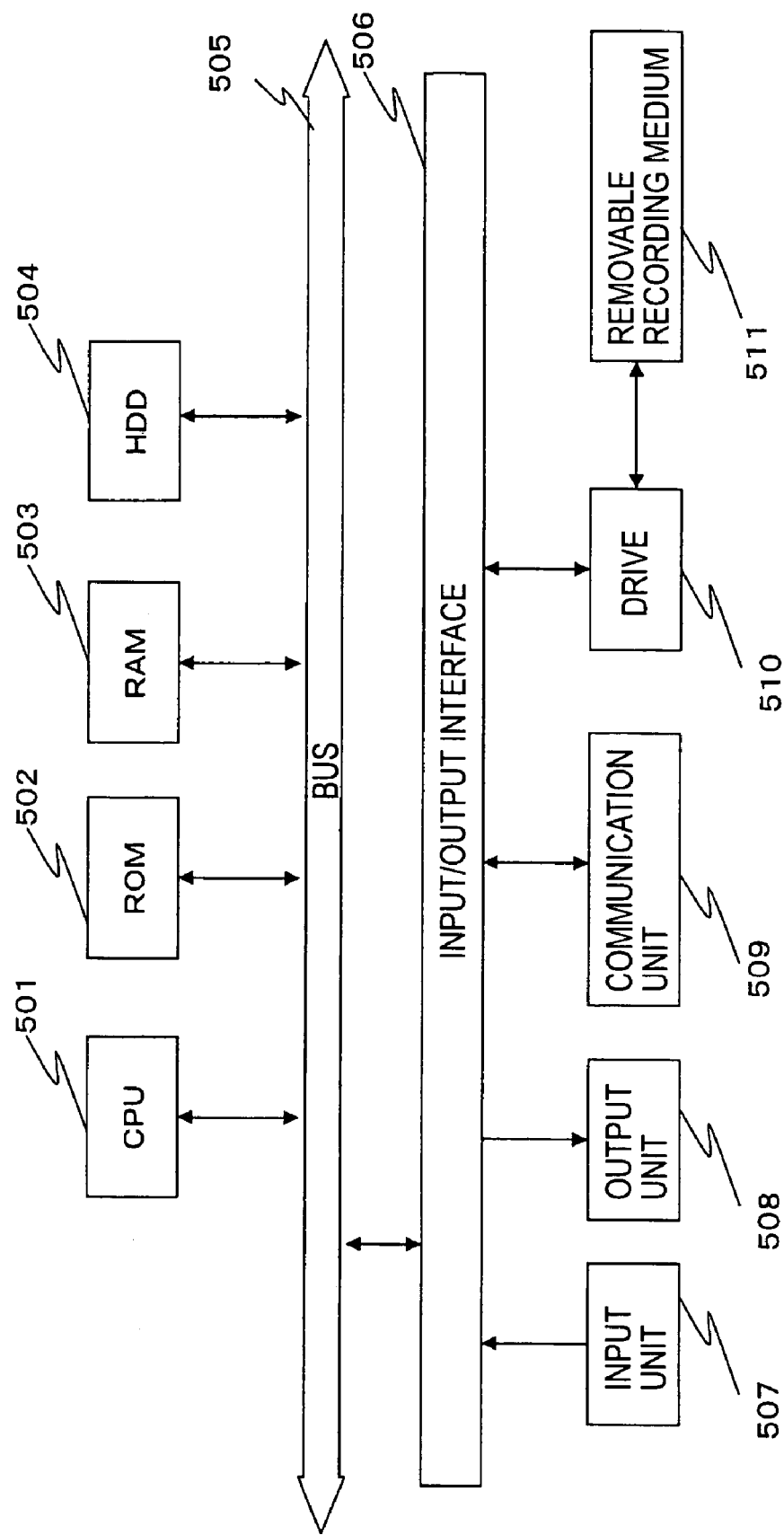
FIG. 7 shows an example of the hardware structure of the user interface providing device according to the embodiment of the present invention.

An example of the hardware structure of the user interface providing device according the embodiment of the present invention will now be described with reference to FIG. 7. For example, the user interface providing device can be realized by a personal computer. For example, images photographed with digital cameras are input to the personal computer, the interface shown in FIG. 3 is displayed on the display of the personal computer, and image processing is performed in accordance with operation information input via the input unit, such as a mouse or a keyboard. FIG. 7 shows an example of a personal computer capable of performing such processing.

The hardware structure of the personal computer shown in FIG. 7 will now be described. A central processing unit (CPU) 501 performs various types of processing in accordance with a program stored in a read-only memory (ROM) 502, a hard disk drive (HDD) 504, or the like, and functions as a data processing unit or a communication control unit. The program and data executed by the CPU 501 are stored in a random-access memory (RAM) 503 in an appropriate fashion. The CPU 501, the ROM 502, the RAM 503, and the HDD 504 are connected to each other via a bus 505. For example, processing performed by the CPU 501 is equal to the processing described with reference to the flowchart shown in FIG. 2. The CPU 501 provides the user interface shown in FIG. 3 on the display functioning as an output unit 508, and it performs pixel value correction processing based on various parameters in accordance with user operation information acquired via a mouse or a keyboard functioning as an input unit 507. The CPU 501 also performs display control of an original image, a corrected image, and the like.

An input/output interface 506 is connected to the bus 505. The input/output interface 506 is connected to, for example, the input unit 507 including a keyboard, a switch, a button, or a mouse operated by the user and the output unit 508 including a liquid crystal display (LCD), a cathode-ray tube (CRT), or a speaker presenting various types of information to the user. In addition, a communication unit 509 functioning as a data sending and receiving unit and a drive 510 are connected to the input/output interface 506. A removable recording medium 511, such as a magnetic disk, an optical disk, a magneto-optical disk, or a semiconductor memory, can be installed on the drive 510. The drive 510 reads data from the removable recording medium 511 and writes data to the removable recording medium 511.

Although the structure in FIG. 7 shows an example of a personal computer functioning as a user interface providing device according to the embodiment of the present invention, the user interface providing device is not necessarily a personal computer. The user interface providing device may be a digital camera, a cellular telephone, a portable terminal, such as a personal digital assistant (PDA), or other types of electronic devices or information processing devices.

As described above, the present invention has been described with reference to the particular embodiment. However, it is obvious that modifications and substitutions may be made to the present invention by those skilled in the art without departing from the spirit and the scope thereof. In other words, the present invention is disclosed by way of an example and the present invention should not be understood in a limited way. In order to determine the summary of the present invention, the claims should be referred to.

It should be understood by those skilled in the art that various modifications, combinations, sub-combinations and alterations may occur depending on design requirements and other factors insofar as they are within the scope of the appended claims or the equivalents thereof.

What is claimed is:

1. A user interface providing device, wherein:
the user interface providing device provides a user interface that handles correction of a pixel value of each of pixels forming image data; and
the user interface includes a hue setting unit for selecting a pixel by designating a hue;
wherein the device analyzes the image data to identify over exposed pixels, false-color pixels, and correctly set pixels, and corrects the values of the overexposed and false-color pixels based on the value of the other pixels.

2. The user interface providing device according to claim 1, wherein the user interface further includes a saturation setting unit for selecting the pixel by designating a saturation.

3. The user interface providing device according to claim 1, wherein the user interface further includes a selected color display unit for displaying color selection area information corresponding to the hue or the saturation set by the hue setting unit or the saturation setting unit.

4. The user interface providing device according to claim 1, wherein the user interface further includes a search image area setting unit for setting a search image area in which the pixel whose hue is designated is selected.

5. The user interface providing device according to claim 1, wherein the user interface further includes an overexposed highlight threshold value setting unit for setting a threshold value corresponding to a pixel value for selecting an overexposed highlight pixel from among the pixels forming the image data.

6. The user interface providing device according to claim 1, wherein the user interface further includes an image display unit for selectively presenting an image to be corrected and a corrected image.

7. The user interface providing device according to claim 6, wherein the image display unit distinguishably displays a pixel having a pixel value corresponding to the hue set by the hue setting unit.

8. The user interface providing device according to claim 6, wherein the image display unit distinguishably displays an overexposed highlight pixel from among the pixels forming the image data.

9. The user interface providing device according to claim 6, wherein the image display unit presents processed image data corrected based on a parameter updated by a user operation using the user interface in accordance with parameter updating processing.

10. The user interface providing device according to claim 1, wherein the user interface further includes an area setting unit for selecting an image area to be corrected.

11. The user interface providing device according to claim 1, wherein the user interface further includes a storage operation unit for storing a parameter set by a user operation using the user interface.

12. The user interface providing device according to claim 1, wherein the user interface further includes a reading operation unit for reading from a storage unit a parameter set by a user operation using the user interface.

13. The user interface providing device according to claim 1, wherein the corrected values for the overexposed and false-color pixels is determined using an interpolation technique using an average of the values of the correctly set pixels surrounding the overexposed and false-color pixels, and thereby changes the overexposed and false-color pixels to correctly set pixels.

14. The user interface providing device according to claim 13, wherein the when the interpolation technique is used to set a given overexposed or false-color pixels, the interpolation technique only uses correctly set pixels adjacent to the given overexposed or false-color pixel.

15. The user interface providing device according to claim 13, wherein the when the interpolation technique operates iteratively to set the values of overexposed or false-color pixels that are not adjacent to correctly set pixels.

* * * * *